April 2, 1940.  A. A. DE BONS  2,196,143
THREE-WAY VALVE FOR PNEUMATIC CONVEYERS
Filed Sept. 10, 1938
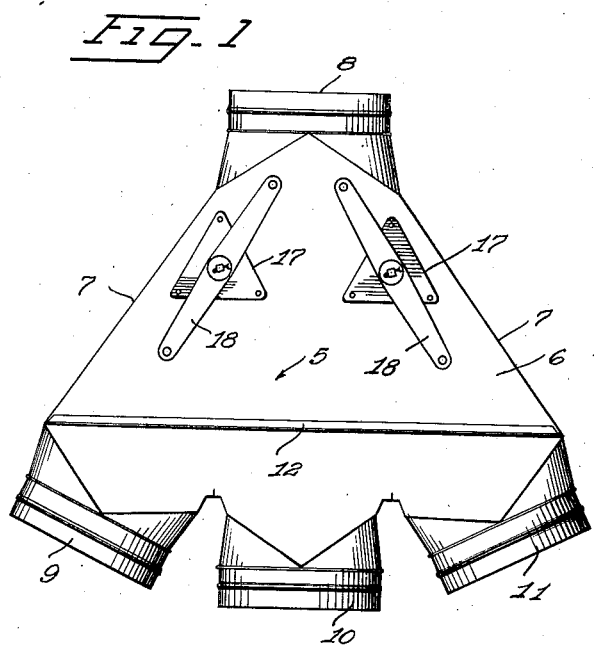
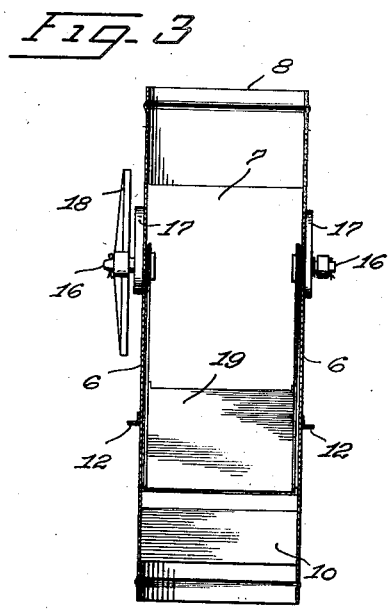
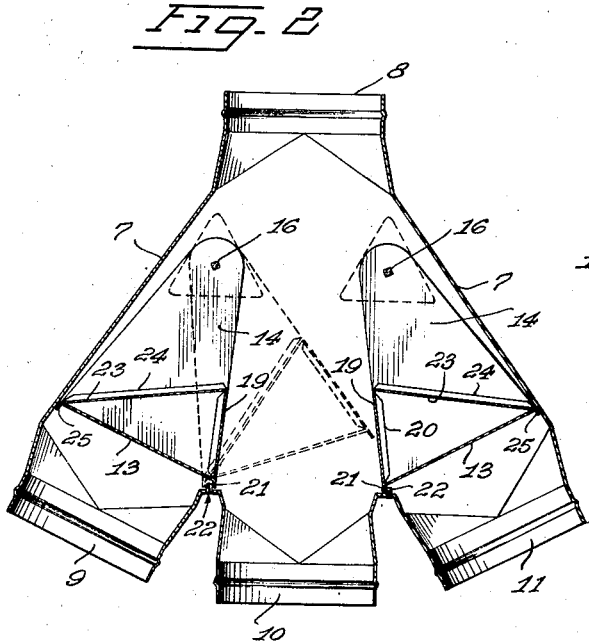
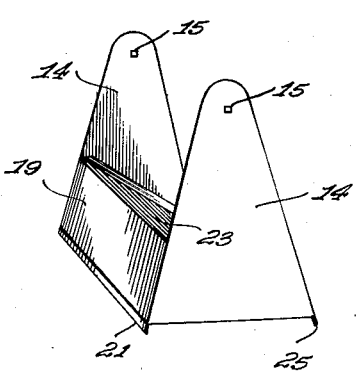
Inventor
A. A. DeBons
By A. R. Townshend Jr.
Attorney Patented Apr. 2, 1940

2,196,143

UNITED STATES PATENT OFFICE 2,196,143

THREE-WAY VALVE FOR PNEUMATIC CONVEYERS

Albert A. De Bons, Paragould, Ark.

Application September 10, 1938, Serial No. 229,379

7 Claims. (Cl. 277—60)

This invention relates to pneumatic conveyers and in particular to a multi-way valve assembly for use therewith. An object of the invention is to provide a novel valve assembly for pneumatic conveyers, in which three conveyer lines may be connected into a single line under selective control.

Another object is to provide a three way valve for pneumatic conveyers, which is of simple construction, and having three inlets and a common outlet in communication with one inlet at all times.

Other objects will be apparent from the description. The present disclosure constitutes an exposition of the best means I have thus far devised for reducing the invention to practice. It is to be understood that various changes and modifications may be made in the structural details within the limits imposed by the scope of the invention as claimed.

In the drawing:

Figure 1 is an elevation of the valve.

Figure 2 is a vertical section therethrough.

Figure 3 is a vertical central section through the valve at right angles to Figure 2.

Figure 4 is a perspective view of one of the damper controls.

The improved valve comprises a fitting 5 of generally triangular elevation with a pair of opposed parallel flat side walls 6 connected by inclined end walls 7 which converge at their upper ends, with respect to Figure 1, into an outlet pipe collar 8 into which the side walls 6 also merge. At the broad base end of the fitting the respective walls join three intake pipe collars 9, 10 and 11 by which three pneumatic conveyer lines may be fed to the interior of the valve fitting, the outlet 8 being common to all three.

Each side wall has secured thereto an angle iron flange 12 by which the valve may be mounted upon a suitable support, not shown. The central intake 10 and the outlet 8 are in coaxial registry. Their common axis will, for purposes of description, be referred to as the axis of the valve, and this axis is intersected substantially at the inner end of the outlet 8 by the convergent axes of the two end intakes 9 and 11.

Mounted within the fitting 6 are two control dampers, each of which is of stirrup form having a flat rectangular base plate 13 of an area corresponding to the cross sectional area of an intake at its inner end, the three intakes being of equal cross section at their inner ends. The base plate 13 has at each end an integral perpendicular leg 14 of substantially triangular form by which the damper is supported to oscillate within the casing of the fitting. The apex portions of the damper legs are provided with square holes 15 in transverse registry and which receive squared shoulder bolts whose heads are disposed internally of the casing and which have rounded shank portions journalled in bearing plates 17 secured externally on the walls 6. At one side of the casing the shanks of the bolts 16 have secured thereon operating levers 18 by which the dampers may be actuated.

As shown in Figure 2, the two dampers are so disposed that the axis of oscillation of each, that is, the axis of the bolts 16, approximately intersects the axis of the corresponding end intake 9 or 11. Thus, when the dampers are oscillated to their outer arc limits their respective bottom plates 13 seat over and completely close the inner ends of the intakes 9 and 11, leaving the center intake 10 unobstructed.

Each damper has a flat stop plate 19 extending transversely between the legs 14 at their inner sides and in the plane of the edges of the legs, being secured to the legs by means of end flanges 20 welded or otherwise suitably secured thereto. An integral flange 21 extends slightly below the underlying side edge of the bottom plate 13 to provide a stop engageable against an abutment 22 on the interior of the casing and extending transversely between the sides 6. There are two such abutments, one located at the junction of the inner ends of the intakes 9 and 10, and the other at the junction of the inner ends of the intakes 10 and 11. A preferable manner of forming the abutments is by crimping the thin galvanized metal stock from which the casing is made.

The stop plates 19 extend upwardly for approximately one third the height of the legs and connect at their upper edges with deflector plates 23 which extend transversely between the legs 14, being secured thereto by means of end flanges 24. The deflector plates are flat and are directed diagonally from the upper edges of the stop plates 19 downwardly to the outer side edges of the damper base plates 13, which have depending stop flanges 25 angled in the plane of the outer side edges of the legs. The plates 19 and 23 may obviously be integral if desired.

In Figure 2 the dampers are shown in full line position as closing the end intakes 9 and 11, with the stops 21 engaged flatly against the abutments 22 and the stops 25 bearing flatly against the inclined end walls 7. In the usual manner of pneumatic conveyers suction is applied at the outlet 8 and acts upon whichever one of the intakes is open to draw material through the valve, it being understood that the three intakes are connected to conveyer lines, not shown, leading from different points of supply. For clearness of detail the damper closing the intake 9 at the left of Figure 2 is illustrated as slightly opened, but in service it is closed as is the one at the right closing the intake 11. The engagement of the stop flanges 21 and 25 against the abutments 22 and the end walls 7 effects a seal completely closing off the two end intakes and preventing suction loss.

Figure 2 illustrates in dotted lines the position of the left hand damper when the intake 9 is opened and the intakes 10 and 11 are closed. In effecting this arrangement the damper is swung over until its stop flange 21 abuts the stop plate 19 of the other damper, and with its stop flange 25 engaged against the abutment 22. In this position the center intake 10 is completely closed and the deflector plate 23 is disposed substantially parallel with the inclined end wall 7 adjacent which the damper is mounted, so that incoming material is guided over the stop plate and prevented from catching thereon.

If it is desired to open the intake 11 the left hand damper is swung to close the intake 9 and the right hand damper is swung over across the center intake 10 until its stop flange 21 abuts the stop plate 19 of the left hand damper. It will be noted that when the center intake is open the two stop plates 19 of the dampers provide an axial continuation of the intake and prevent the incoming material from catching on the deflector plates 23.

The pivotal axes of the dampers, that is, the axis of each bolt 16, extend transversely between the side walls 6 in planes which are tangential to the periphery of the outlet collar 8 and which pass substantially through or adjacent the abutments 22. As the damper legs 14 are of triangular shape this arrangement imparts a slight convergence between the stop plates 19 when the end intakes are closed and the center intake is open, somewhat restricting the bore of the intake and providing, in effect, a nozzle jet action which prevents spreading of material within the valve casing and directs the flow axially of the outlet. In like manner, due to the effective length of the deflector plates 23, when either end intake is opened the adjacent end wall 7 is somewhat convergent with respect to the deflector plate so that the same nozzle jet effect obtains.

I claim:

1. A pneumatic conveyer valve comprising a hollow casing, a suction outlet therefor at one point, a central inlet therefor at another point in axial registry with the outlet, an end inlet on one side of the central inlet, an end inlet on the opposite side of the central inlet, a damper oscillatable within the casing to close either the central or one end inlet, a second damper oscillatable within the casing to close either the central or the other end inlet, cooperative stop means on said dampers and casing for positioning said dampers at all times to close two inlets while the third is open, deflector means disposed on said dampers at an angle thereto for guiding incoming material past the closed dampers, and means for oscillating said dampers externally of the casing.

2. A pneumatic conveyer valve comprising a hollow casing, a suction outlet therefor at one point, a central inlet therefor at another point in axial registry with the outlet, an end inlet at one side of the central inlet, an end inlet at the opposite side of the central inlet, a damper oscillatable within the casing to close at one limit of its movement the central inlet and to close at the other limit of its movement one end inlet, a second damper oscillatable within the casing to close at one limit of its movement the other end inlet and at the other limit of its movement to close the central inlet, an abutment on the interior of the casing between each end inlet and the center inlet, and stop means carried by the dampers and engageable with the respective abutments to limit the extent of oscillation of the dampers.

3. A pneumatic conveyer valve comprising a hollow casing, a suction outlet therefor at one point, a central inlet therefor at another point in axial registry with the outlet, an end inlet on one side of the central inlet, an end inlet on the opposite side of the central inlet, a damper oscillatable within the casing to close either the central or one end inlet, a second damper oscillatable within the casing to close either the other end inlet or the central inlet, said dampers being spaced apart at their axes of oscillation, a stop plate at the adjacent side edge of each damper and engageable against the other to limit movement of the dampers in one direction, and means externally of the casing for oscillating said dampers.

4. A three way valve for pneumatic conveyers, comprising a substantially triangular hollow casing having a pair of opposed parallel side walls and convergent end walls, a suction outlet at the apex portion of said walls, a central inlet in the base portion of the casing in axial registry with the outlet, an end inlet between the central inlet and one end wall, an end inlet between the central inlet and the other end wall, a damper pivotally suspended within the casing adjacent one end wall and adapted in one position to close the adjacent end inlet, a second damper pivotally suspended within the casing adjacent the other end wall and adapted in one position to close the adjacent end inlet, said dampers when in said positions leaving the central inlet unobstructed, means for swinging either damper across the central inlet to abut the other damper and close the central inlet, and an inclined material deflector carried by each damper in a position to form with the adjacent end wall of the casing a continuation of one end inlet when the damper is swung across the central inlet to close same and open the respective end inlet.

5. A three way valve for pneumatic conveyers, comprising a hollow casing having a pair of opposed substantially triangular parallel side walls, a bottom connecting said walls transversely at the base thereof, convergent end walls, a suction outlet at the apex of all said walls, a central inlet in the bottom in axial registry with the outlet, an end inlet in the bottom between the central inlet and one end wall, another end inlet in the bottom between the central inlet and the other end wall, the axes of said end inlets being convergent in the axis of the central inlet adjacent said outlet, all said inlets being of equal cross sectional area, a damper in the casing adjacent one end wall and having a flat bottom plate extending between the side walls to overlie and close the adjacent end inlet, a leg at each end of said plate perpendicular thereto and slidable on the adjacent side wall of the casing, operating members connected with the upper ends of said legs and pivoted through the side walls of the casing for oscillating said damper within the casing, said legs having side edges convergent from the bottom plate to their upper ends, a flat stop plate flush with the inner side edges of said legs and extending transversely therebetween above the bottom plate, a deflector plate extending transversely between said legs and inclined diagonally from the upper edge of said stop plate to the outer edge of said bottom plate, a second and similar damper in the casing adjacent the other end wall, and either of said dampers being movable across the central inlet into abutting engagement with the stop plate of the other damper whereby to close the central inlet and open its respective end inlet while the other end inlet remains closed.

6. A pneumatic conveyer valve damper comprising a flat bottom closure plate, an upstanding perpendicular leg at each end thereof and having side edges convergent upwardly from the bottom plate, a stop plate extending transversely between the legs along one pair of their side edges and projecting downwardly below the adjacent side edge of the bottom plate to provide a stop flange, and a material deflector plate extending transversely between said legs from the upper edge of the stop plate diagonally downward to the other side edge of the bottom plate and projecting therebelow to provide a second stop flange.

7. A pneumatic conveyer valve comprising a hollow casing having a pair of substantially triangular opposed side walls connected by a bottom and by upwardly convergent end walls, a suction outlet at the apex of said side and end walls, a central inlet in the bottom in axial registry with the outlet, an end inlet in the bottom between each end wall and the central inlet, a damper mounted within the casing adjacent each end wall and normally closing one inlet, means for oscillating said dampers for selective closing of any two inlets while the other remains open, and material guiding plates arranged on said dampers for mutual cooperation in slightly convergent relation at opposite sides of the central inlet when the end inlets are closed, and being respectively cooperable in slightly convergent relation with the adjacent casing end wall at opposite sides of whichever end inlet is opened depending upon the position of the dampers.

ALBERT A. DE BONS.